March 22, 1938.   W. C. REA   2,111,872
METHOD OF AND APPARATUS FOR QUARRYING AND SHAPING ROCK AND STONE
Filed Nov. 6, 1933   4 Sheets-Sheet 1
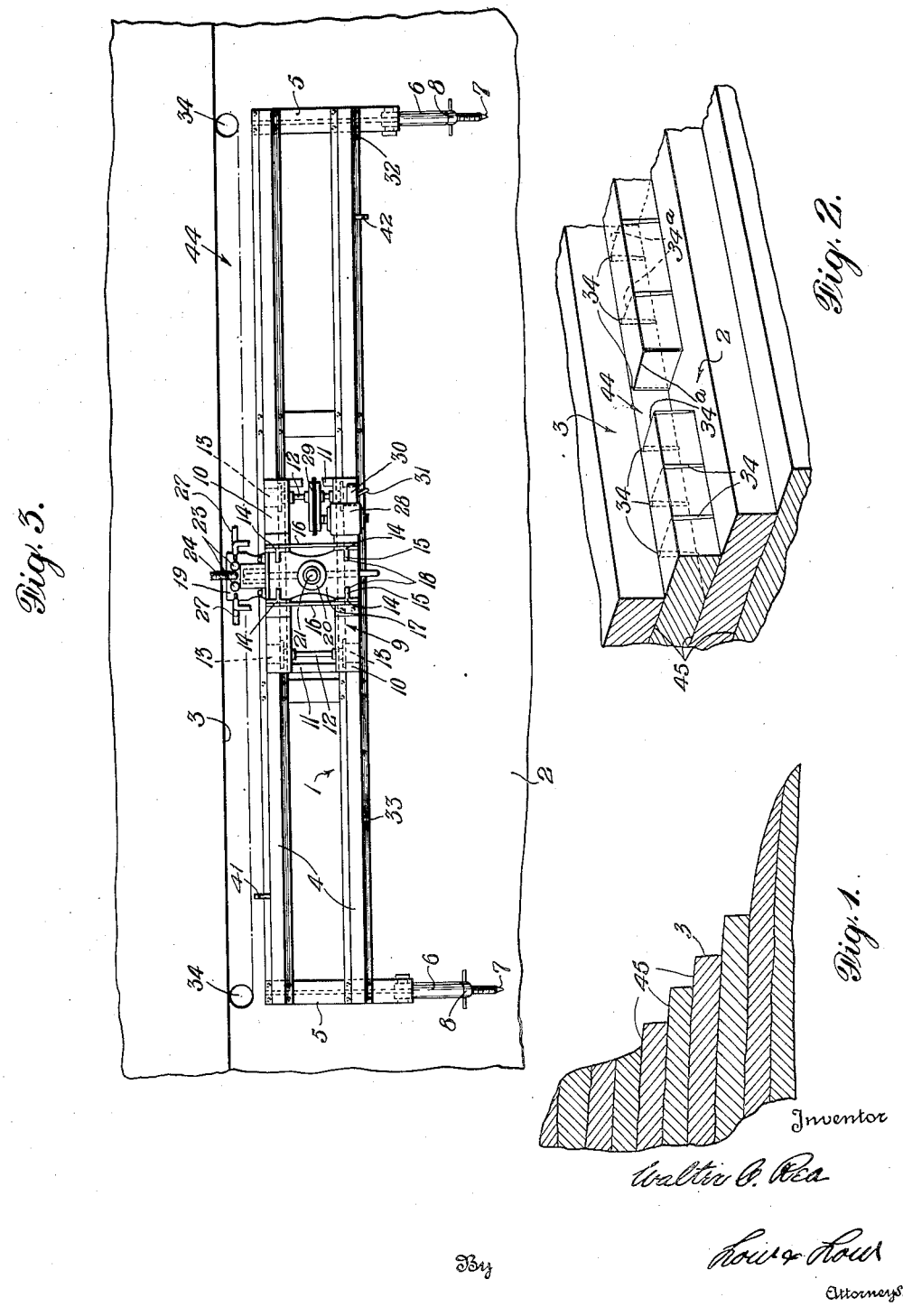
Inventor
Walter C. Rea
By Rowe & Rowe
Attorneys.

March 22, 1938.  W. C. REA  2,111,872
METHOD OF AND APPARATUS FOR QUARRYING AND SHAPING ROCK AND STONE
Filed Nov. 6, 1933  4 Sheets-Sheet 2
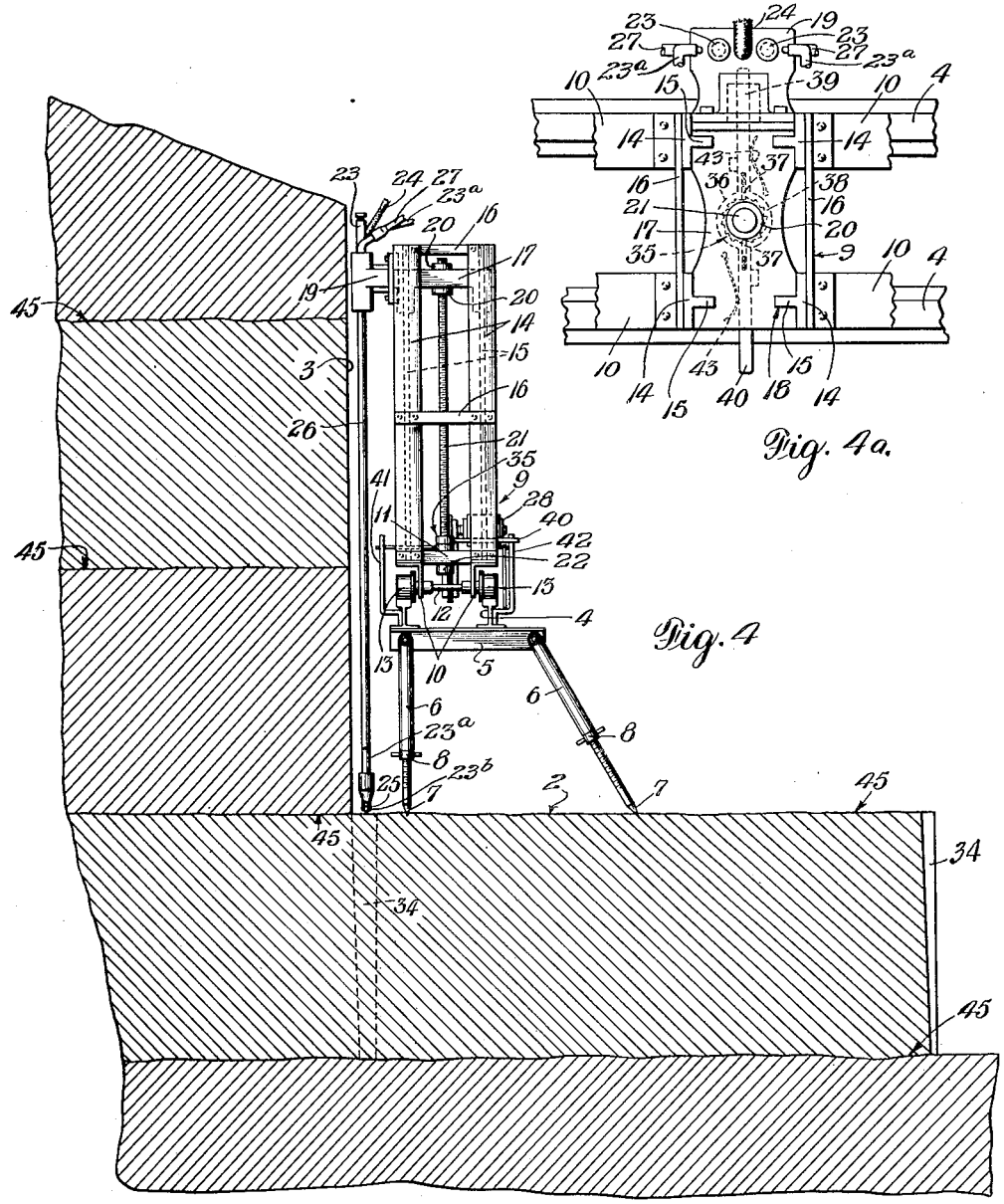

March 22, 1938. W. C. REA 2,111,872
METHOD OF AND APPARATUS FOR QUARRYING AND SHAPING ROCK AND STONE
Filed Nov. 6, 1933 4 Sheets-Sheet 3
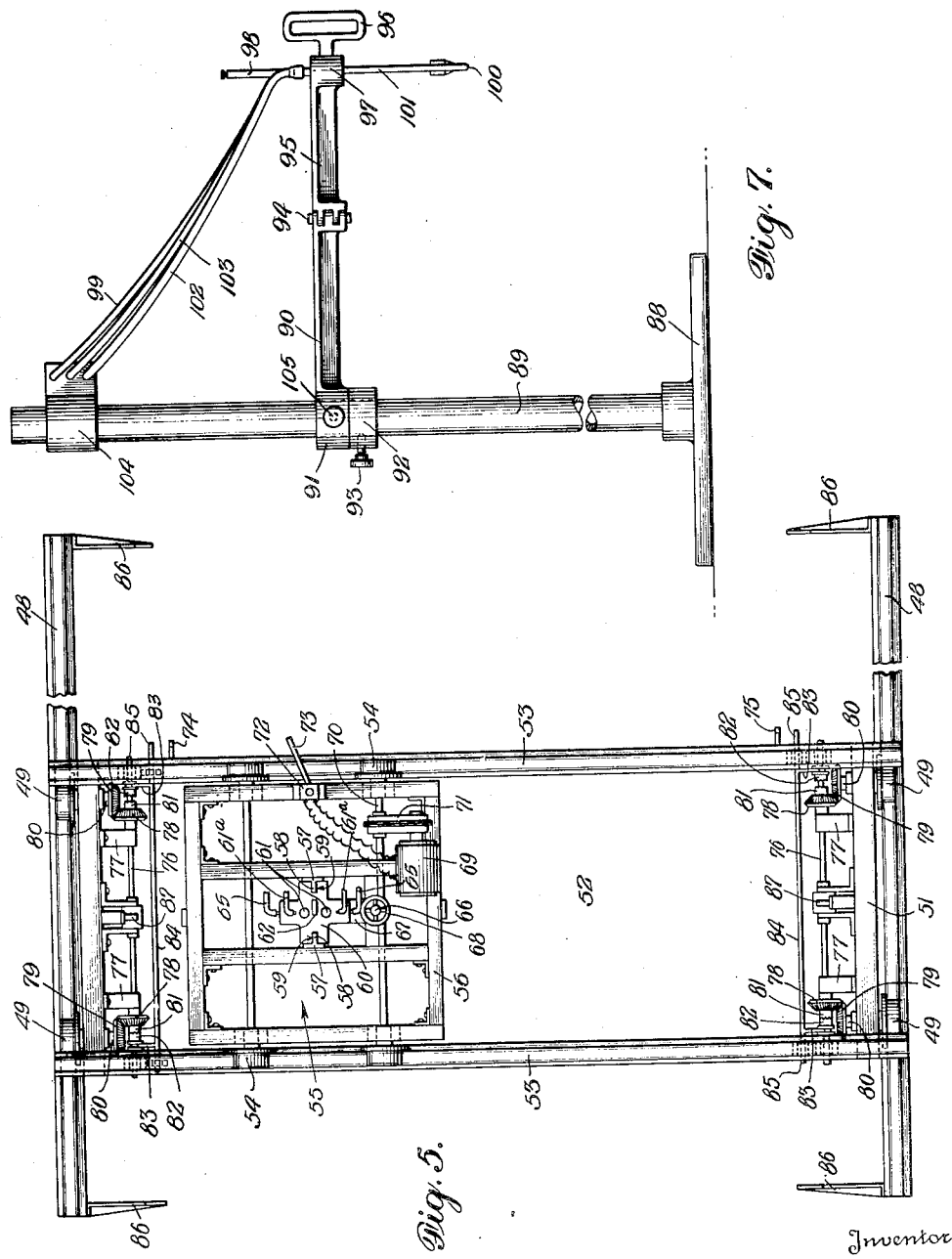
Inventor
Walter C. Rea
By
Low & Low
Attorneys

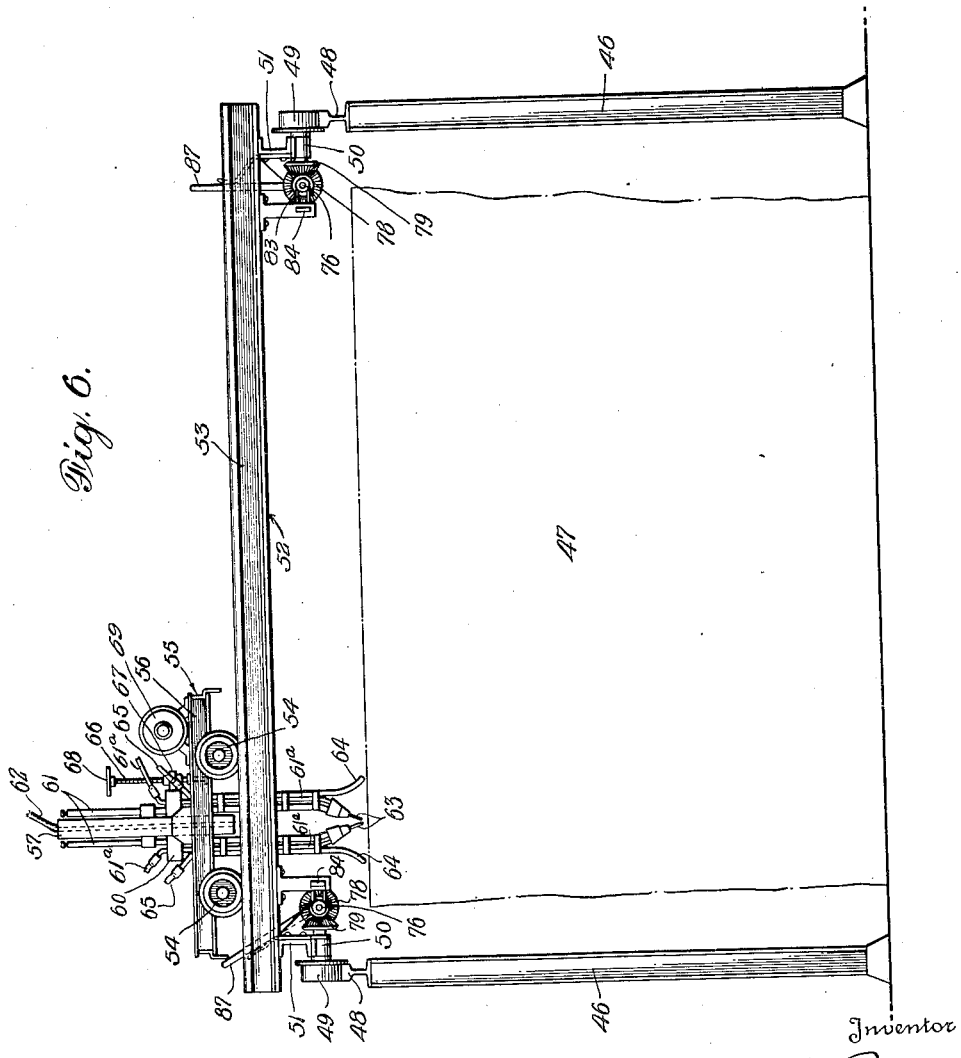

Patented Mar. 22, 1938

2,111,872

UNITED STATES PATENT OFFICE 2,111,872

METHOD OF AND APPARATUS FOR QUARRYING AND SHAPING ROCK AND STONE

Walter C. Rea, New York, N. Y.

Application November 6, 1933, Serial No. 696,886

13 Claims. (Cl. 262—1)

The invention relates to a method and apparatus for mining, quarrying and dressing hard material, such as stone, granite, marble and the like, and has for its objects to provide certain new and useful improvements in methods and apparatus of this character as heretofore employed.

An important object of the invention is to provide a novel method of quarrying block stone or granite, according to the desired dimensions, and without necessitating the use of a large number of closely spaced drill holes and alternate web broaching which has heretofore been necessary in obtaining dimension stone direct from the quarry.

A further object of the invention is to provide a novel and effective method and apparatus for dressing or finishing dimension stone to any predetermined or desired finished and uniform size.

A still further object is to provide a method and apparatus of the character described in which the dimension stone may be obtained from the quarry with a material saving in time, labor and expense as compared to methods as now practiced.

A further object of the invention is to improve materially on sanitary and health conditions heretofore attending mining, quarrying and dressing operations, by eliminating to a great extent the presence of dust and microscopic rock particles which endanger the lives and health of the workers and are a cause of the serious disease known as "silicosis" among quarry workers and stone dressers.

A further object of the invention is to provide an apparatus which may be conveniently assembled and manipulated directly at the quarry or in a stone dressing plant, provision being made for adjustments to accommodate the nature and dimension of the stone to be quarried, as well as other conditions peculiar to the particular operation being carried out.

In removing stone from a granite quarry for dimension stone purposes, such as building stones and monuments, it has been the practice to establish cleavage planes where no planes previously exist, or in quarries where the planes are existent, the stone is removed according to such planes. These planes are known as bedding planes and are established as to one dimension.

The next step is to drill a series of holes as close together as possible along the faces which will give width and height to the desired stone to be removed. The web between the holes is then removed by a broaching operation, which consists in breaking the web by a fish-tailed tool percussively driven with the wings of the fish-tailed tool respectively disposed in the holes on either side of the web.

To remove a stone lying between two bedding planes eight feet apart and measuring 6 feet in width by 12 feet in length requires drilling of holes on lines totaling 36 feet long. With holes spaced three inches center to center, this operation has required 144 holes each eight feet long or a total drilling distance of 1152 feet.

Averaging the diameter of these holes at two inches will require the removal of 43,407 cubic inches of rock for the holes plus an additional 60% for the removal of the web or the removal of a grand total of 69,651 cubic inches of rock is necessary to obtain a stone measuring 6 ft. x 8 ft. x 12 ft.

After the first stone is removed from a course, the balance of the stone in the course then has a free face which only requires the holes and webs to be drilled on three faces instead of the four faces on the original stone in the course.

All of the above described conditions and methods of operation according to former quarrying methods are crude and tedious and greatly prolong the time and labor required for quarrying, as well as materially adding to the cost of the ultimate product. The instant invention contemplates obtaining the quarried rock with a great decrease in expense as well as practically eliminating the described disadvantages attendant upon prior methods.

According to the present invention the rock is removed from the quarry in any desired dimensions, and if desired thereafter dressed, by the alternate application of heat and cold closely following one upon the other thereby resulting in a breaking down, shattering or disintegration of the highly heated rock into its component parts when the cooling medium is applied. The invention further contemplates the use of this alternately applied heat and cold to the rock being quarried or treated, along any desired line of separation and provision is made for directing the heating and cooling unit along any predetermined path and in any desired direction.

With such objects in view, as well as other advantages which may be incident to the use of the improvements, the invention consists in the procedure, and in the use of the parts and combinations hereinafter set forth and claimed, with the understanding that the several necessary elements constituting the same may be varied in proportions and arrangement without departing from the nature and scope of the invention.

In order to make the invention more clearly understood there are shown in the accompanying drawings means for carrying the same into practical effect, without limiting the improvements, in their useful applications, to the particular constructions which, for the purpose of explanation, have been made the subject of illustration.

In the accompanying drawings:

Figure 1 is a diagrammatic vertical sectional view through a rock quarry and illustrating the strata of rock separated by lines of cleavage and from which rock has been removed to form a series of superposed benches.

Figure 2 is a diagrammatic perspective view of a rock quarry showing the bench formation and the method of removing blocks of stone of predetermined dimension therefrom.

Figure 3 is a plan view of a quarrying machine constructed in accordance with the present invention and illustrating it in operative position on a bench of a rock quarry.

Figure 4 is an end elevational view of the structure shown in Fig. 3.

Figure 4ª is an enlarged plan view of a portion of the structure shown in Fig. 3.

Figure 5 is a plan view of a rock dressing or finishing machine constructed in accordance with the present invention.

Figure 6 is a front elevational view of the structure shown in Fig. 5, and

Figure 7 is a side elevational view of a modified form of rock dressing or finishing machine adapted to be operated manually.

Referring to the drawings, and particularly to Figs. 1 to 4 inclusive, a rock quarrying machine constructed in accordance with the present invention is shown as comprising a base 1 adapted to be removably mounted upon the horizontal surface 2 of a bench in close proximity to the vertical face 3 thereof. The base 1 consists of a pair of rails 4 arranged in parallel relation with respect to one another and to the face 3 of the bench and are connected by transversely extending T-beams 5 located at each end of the rails and at intermediate points therebetween. Legs 6 are pivotally connected to the end beams 5 for angular adjustment as shown in Fig. 4, and are provided with sharpened extremities 7 for antislipping engagement with the surface 2 of the bench. The legs 6 are also adjustable as to length by suitable turnbuckle devices 8 so that the base 1 will be held steady in a desired position irrespective of irregularities in the surface 2 of the bench.

Mounted for horizontal movement along the rails 4 is a carriage indicated generally at 9 and which preferably comprises a pair of parallel bars 10 of inverted L shaped construction connected by transverse bars 11. Axles 12 are suitably journaled on the bars 10 and carry flanged wheels 13 for engagement with the rails 4. Mounted on the carriage 9 are two pairs of vertically extending guide members 14 of T-beam construction and arranged with their intermediate webs or flanges 15 extending inwardly towards one another. These members 14 are suitably connected by transversely extending braces 16 so as to provide a rigid unyielding structure. Mounted between the guide members 14 for vertical sliding movement is a horizontally extending head 17 provided with slots 18 for engagement with the opposed flanges 15 of the guide members 14 and with a laterally projecting boss 19 which carries the heating and cooling means hereinafter to be described.

The head 17 is also formed with a centrally disposed internally threaded boss 20 which is threaded onto a vertically extending screw threaded rod or shaft 21 the lower end of which is rotatably mounted on the carriage 9, as indicated at 22, but held against axial displacement with respect thereto.

The heating means may be of any desired or preferred type but is conventionally illustrated as comprising a pair of vertically extending tubular members 23 adapted to house electric cables 24 terminating at their lower ends in a heating unit 25 illustrated as comprising a pair of electrodes spaced so as to produce an arc therebetween. These electrodes may consist of tungsten wires normally urged downwardly to compensate for wear, by suitable springs (not shown) contained within the tubular members 23. These electrodes are located adjacent the surface of the rock at the base of the vertical surface 3 of the bench, as indicated in Figure 4, and are capable of developing with or without atomic hydrogen, an electric arc of sufficient temperature to fuse or melt the surface of the rock in the vicinity thereof.

A pair of gas conductors or pipes 23ª are provided for conveying the gas to the vicinity of the electrodes 25. The electrode magazines and gas pipes terminate at their lower ends in gas tips 23ᵇ.

The cooling means in the present instance may be either air or water or both, which is supplied to the heated area of the rock through vertically extending pipes 26, the upper ends of which are carried by the boss 19 and the lower ends of which terminate adjacent to the electrodes 25. Flexible pipes 27 are secured to the upper ends of pipes 26 and are adapted to be connected at their other ends to a suitable source of air or water supply.

The carriage 9 is moved back and forth along the rails 4 by means of an electric motor 28 of the reversible type which is mounted on the carriage 9 and which is operably connected to one of the axles 12 thereof by a suitable reduction gearing, indicated at 29. The direction of rotation of the motor 28 is controlled by means of a reversing switch 30 provided with an outwardly extending handle or lever 31 for engagement with stops 32 and 33 located at opposite ends of the rails 4 so that when the carriage reaches the end of its travel to the right as viewed in Fig. 3 the handle 31 will engage the stop 32 and is actuated thereby to reverse the direction of rotation of the motor so as to move the carriage in the opposite direction. When the carriage reaches its limit of travel in the opposite direction the handle 31 will engage the stop 33 and be actuated thereby to again reverse the direction of rotation of the motor and the direction of the movement of the carriage 9 and parts carried thereby. This back and forth movement of the carriage causes the heating unit to traverse a rectilinear path along the base of the surface 3 of the bench and progressively heat the rock located in its path to a fusing temperature which is immediately chilled by the cooling medium so as to disintegrate the rock into its component parts. If the cooling medium is water this disintegrated rock will form a sludge which is removed either by the force of the water, an air blast or both. This movement and action of the heating and cooling means forms a channel in the rock between two previously drilled holes 34 which are located at a predetermined distance apart and which determine the width of the block of rock to be removed.

The heating and cooling means are intermittently lowered so as to progressively increase the depth of the channel formed thereby, by means of a ratchet device, indicated generally at 35. (Fig. 4ᵃ). This ratchet device comprises a collar 36 which is rotatably mounted on the vertically extending rod 21 and is provided with diametrically disposed pawls 37 for engagement with a ratchet wheel 38 having a screw threaded engagement with the lower end of the rod 21. The collar 36 is also provided with a pair of oppositely extending lever arms 39 and 40 for engagement with vertically extending stops 41 and 42 respectively located at opposite ends of the base 1 (Figs. 3 and 4). The ratchet device is maintained in an intermediate or neutral position by means of springs 43. When the carriage reaches the end of its travel in one direction, the arm 39 will engage the stop 41 and is actuated thereby so as to rotate the rod 21 and cause the head 17 to move downwardly a predetermined distance. As a result, and when the carriage moves in the opposite direction, the heating unit 25 and the cooling means will operate on the bottom of the channel in the manner described so as to increase its depth. When the carriage reaches the limit of its travel in the opposite direction, the arm 40 of the ratchet mechanism engages the stop 42 and again rotates the rod 21 so as to move the head 17 downwardly for the next succeeding cut.

From the foregoing it will be apparent that the heating and cooling means are caused to reciprocate along a path of predetermined length between certain of the previously drilled holes 34, during which they alternately heat and chill the surface of the rock to shatter and disintegrate the same and form a channel or drift which is increased in depth with each reciprocation of the mechanism. The members 23 which carry the heating unit 25 are of such length that a channel of considerable depth may be formed. The depth of the cut channels is determined by the distance between the cleavage planes of the rock which may be located a distance of 6 feet apart. The preferred method of operation is as follows and is best understood with reference to Fig. 2.

After a transverse vertical channel 34ᵃ extending outwardly from or between front and rear holes 34—34 perpendicularly to the face 3 of the bench, has been completed to the required depth, the heating and cooling means are returned vertically to their initial position shown in Fig. 4 and the entire apparatus is moved bodily to the right or left and a second similar and parallel spaced transverse vertical channel 34ᵃ is cut perpendicularly to the vertical face 3 of the bench. The cuttings or sludge resulting from forming the transverse channels 34ᵃ are afforded a free path of escape to the free or exposed front face of the bench. The entire apparatus is then turned at right angles to parallel the surface 3 of the bench and in alignment with two of the holes 34 contiguous to the face 3. The operation of the apparatus is then repeated so as to form a longitudinally extending vertical channel or rift 44 extending between two or more of the holes 34 and connecting the inner ends of the two previously cut transverse channels 34ᵃ. The cuttings and sludge from this latter channel are afforded a path of escape through said transverse channels 34ᵃ to the outer or free face of the bench and speed of operation is therefore facilitated. The apparatus is then removed or set to one side and the block defined by the three longitudinal and transverse channels 44, 34ᵃ thus formed, is removed by separating the same from the parent mass of rock of the quarry by splitting it along a line of cleavage 45. The described operations, in the preferred order outlined, are repeated as often as necessary to remove the desired number of blocks from the quarry.

Each of the blocks of rock thus formed may subsequently be finished by another machine operating in substantially the same manner as that hereinabove described. Such a machine is illustrated in Figs. 5 and 6 and preferably comprises spaced supports or uprights 46 between which a block of stone 47 to be surfaced is arranged. The uprights 46 carry a pair of spaced parallel rails 48 for engagement with flanged wheels 49 journaled in bearings 50 secured to transversely extending channel bars 51 of a main supporting carriage 52. This carriage is provided with a pair of spaced parallel rails 53 extending at right angles to the rails 48 for engagement by flanged wheels 54 of an auxiliary carriage 55. The auxiliary carriage 55 preferably comprises a rectangular frame 56 (Fig. 5) upon which a pair of spaced vertically extending guide members 57 are suitably secured. These guide members are also of T-construction in cross-section, the intermediate flanges 58 of which slidably engage slots 59 provided in opposite sides of a vertically movable head 60.

Mounted for vertical adjustment in the head 60 is a pair of vertically extending tubular members 61 housing electrical conductors 62 which are connected at their lower ends to tungsten electrodes constituting a heating unit 63 carried by or automatically movable by spring pressure within the tubular members 61 and similar to the heating unit 25 heretofore described. If desired, gas conduits for oxygen and acetylene or the like may be carried by the head 60 so that a gaseous flame may be employed as the heating unit. Preferably a single gas conduit 61ᵃ is employed and is carried by the head 60 in addition to self-feeding tungsten electrodes, to the end that a gas of a combustible nature, such as hydrogen, natural gas or city gas, may be passed through the electric arc to break down the gas from the molecular form into the unstable atomic form. This atomic form of gas is only a temporary transition and in its re-union with the oxygen from the surrounding atmosphere, a violent reaction occurs creating intense heat which is utilized in the fusing of the rock. It has been determined that atomic hydrogen method gives a much higher and easier controlled heat, as well as a more economical method, than the electric arc alone or the oxyacetylene flame.

The atomic hydrogen method utilizes electrodes consisting of tungsten wires, with long life, for the contact points and the arc is preferably shielded in order to insure that the gases passing through the arc are broken down into the atoms. The reaction is a chemical one which occurs at a given distance from the end of the tubes, dependent on the pressure of the gas. The heat derived is not the result of electrical energy as the arc simply acts as the agency to change the gas from a stable condition into an unstable form and the heat generated is the result of the chemical reaction. The atomic hydrogen reaction generates 4000° F. of heat which is the highest heat that has been secured by any known means.

Also carried by the head 60 is a pair of vertically extending pipes 64 the lower ends of which terminate adjacent to the surface of the block 47 and the upper ends of which are connected with flexible pipes 65 leading to a source of air or water or both under pressure. The head 60 together with the parts carried thereby may be adjusted vertically by means of a screw 66 which is rotatably mounted in its lower end on the carriage 55 against axial displacement and which is threaded into a boss 67 provided on the side of the head 60. The upper end of the screw 66 is preferably provided with a hand wheel 68 by means of which the screw may be rotated in order to raise and lower the head 60.

The auxiliary carriage 55 is moved back and forth along the rails 53 in order to cause the heating unit 63 to traverse the surface of the block 47, by means of an electric motor 69 of the reversible type which is mounted on the carriage 55 and which is operatively connected to one of the axles 70 thereof by means of a suitable reduction gearing indicated generally at 71. The direction of rotation of the motor 69 is reversed as the auxiliary carriage 55 reaches the end of its travel in opposite directions along the rails 53, by means of a reversing switch 72 (Fig. 5) provided with an outwardly extending operating lever 73 for engagement with stops 74 and 75 located at opposite ends of the main supporting carriage 52. When the carriage 55 reaches the limit of its travel in one direction the lever 73 will engage the stop 74 and is actuated thereby to reverse the direction of rotation of the motor 69 so as to cause the carriage to also reverse its direction of movement. When the carriage 55 reaches the limit of its travel in the opposite direction the lever 73 will engage the other stop 75 so as to again reverse the direction of rotation of the motor 69 and the direction of travel of the carriage 55.

The above described movement of the auxiliary carriage 55 causes the heating and cooling elements to operate on the surface of the rock in the manner hereinbefore described so as to disintegrate and remove a relatively narrow strip of predetermined thickness from the surface of the stone across the surface of the block in the manner of a planer.

When the carriage 55 and parts carried thereby completes its movement across the surface of the block in one direction the entire apparatus is moved laterally a predetermined distance so as to distintegrate and remove another strip from the surface of the block. This is accomplished by providing shafts 76 at each end of the main carriage 52 which are journaled in bearings 77 carried thereby and which are provided with beveled pinions 78 at opposite ends thereof for intermeshing engagement with beveled pinions 79 fixed to the axles 80 of the flanged wheels 49. The beveled pinions 78 are loosely mounted on the shafts 76 and are each provided with a toothed hub 81 for engagement by a cooperating toothed clutch member 82 one of which is slidably keyed on each of the shafts 76. The toothed clutch members 82 are moved by means of yoke members 83 carried by transversely extending bars 84 provided with laterally projecting extensions 85 for engagement with stops 86 located adjacent the ends of the rails 48.

As shown in the drawings, when the auxiliary carriage 55 reaches the end of its travel along the rails 53, the frame 56 thereof engages an upwardly extending lever arm 87 which operates a suitable ratchet device operatively connected with the shafts 76 so as to impart a partial rotation to said shafts and to the flanged wheels 49 through the medium of the beveled gears 78 and 79. This moves the heating and cooling elements bodily the required distance preparatory to making a fresh longitudinal cut in the opposite direction and parallel to the immediately preceding cut. When the apparatus has traversed the entire surface of the rock to be finished one of the extensions 85 will engage the associated fixed stop 86 and shift the bars 84 rearwardly with respect to the direction of movement of the main carriage 52. This movement of the bars 84 causes the disengagement of one of the clutch members 82 with its associated toothed hub 81 at one side of the carriage and the engagement of the clutch member 82 with its associated hub member 81 at the other side of the carriage. As a result the continued reciprocation of the auxiliary carriage 55 causes the opposite rotation of the flanged wheels 49 and a reverse movement of the main carriage 52. This causes the heating and cooling elements to again traverse the surface of the block in an opposite direction to move another layer of rock from its surface. It will be understood that at the completion of each movement of the main carriage 52 across the surface of the block, the heating and cooling means are adjusted downwardly by means of the hand wheel 68 the degree desired. This adjustment is varied in accordance with the degree of hardness of the rock and may be regulated at will by the operator. The above described operations are repeated until sufficient material has been removed from the surface of the block to eliminate all irregularities or imperfections which may exist therein which might otherwise detract from the finished appearance or uniform dimension of the block.

In Fig. 7 there is shown a block finishing and dressing apparatus of the manual type. This apparatus comprises a base 88 provided with a vertically extending column or support 89 upon the upper end of which a horizontally extending arm 90 is mounted for horizontal swinging movement. The arm 90 is provided with a bearing 91 which surrounds the column 89 in seating engagement with a vertically adjustable collar 92 secured to the column 89 by means of a set screw 93. Pivotally mounted upon the outer extremity of the arm 90, as indicated at 94, is an auxiliary arm 95 the outer end of which is provided with an operating handle 96 and with a boss 97. Mounted in the boss 97 are a plurality of vertically extending tubular members 98 in which cables 99 and gas conduits 103 are housed for supplying current or gas or both to electrodes 100 provided at the lower end of the tubular members 98.

Pipes 101 are also carried by the boss 97 and extend vertically one on each side of the pipes 98 for projecting water or air or both against the surface of the heated rock. Water or air or both are supplied to the upper ends of pipe or pipes 101 by means of a flexible pipe 102 carried by a bracket 104 provided on the upper end of the standard 89 and which lead to a suitable source of fluid supply.

The boss 91 of the arm 90 is provided with a set screw 105 which may be tightened in order to lock the arm 90 in fixed position on the standard 89 after which the collar 92 may be lowered by loosening the set screw 93 to another adjusted position after which the set screw 105 is loosened so as to permit the arm 90 to be slid vertically until it again seats upon the upper surface of the collar 92. This provides a convenient means for adjusting the height of the arm 90 and parts carried thereby without any danger of the same falling when the collar 92 is adjusted.

The pivotal connection between the arm 90 and the column 89 and also between the arm 95 and the arm 90 provides a universal connection by means of which the heating and cooling instrumentalities may be moved by manual manipulation of the handle 96 in any direction across the surface of the block being finished so as to traverse the entire area thereof.

From the foregoing it will be apparent that I have provided a very simple and efficient mechanism for not only removing a block of stone of predetermined dimension from a quarry but by means of which the block thus removed may be finished so as to provide smooth and accurate surfaces of the desired dimensions.

Also it will be apparent that by means of my improved construction substantially all dust and particles of rock in suspension are eliminated, thereby removing the injurious effects upon the health heretofore encountered in rock quarrying.

Since the described method of mining and quarrying results in smooth and uniform cuts, it is only necessary to dress the top and bottom surfaces of a given mined block, as distinguished from the necessity for dressing all surfaces or faces of the block when the latter is obtained by the broaching method heretofore employed, i. e. mining the block by means of a plurality of spaced drill holes defining the desired dimensions of the block.

Preferably a hood or shield (not shown) is employed to surround and protect the heating and cooling unit in the vicinity of the electrodes. Such a shield serves to enclose the unit and protect the same against outside influences such as wind currents and the like, as well as insuring the proper disassociation of the gas at the arc between the electrodes.

If desired the heating unit may be mounted on the end of a journaled arm or upon a circular carriage disposed in a horizontal plane. In this manner the perimeter of a circular vertical hole may be cut and the core removed in the same manner as now employed in diamond drilling. Similarly, by mounting the heating and cooling unit or elements on a vertical circular track and advancing the unit in a horizontal direction, a circular bored tunnel may be cut and the core broken down for removal. This method would cut a tunnel to exact predetermined dimension sizes.

In the event a straight electric arc is employed between the electrodes the heat generated is approximately 3,300° Fahr. but in view of the problem of properly spacing the electrodes in order to obtain a fused channel of the desired width with incidental even distribution of heat, it may be preferable to employ the described atomic hydrogen method.

What is claimed is:

1. Apparatus of the character described comprising a support adapted to be superimposed upon a mass of rock to be removed, a carriage mounted on said support for movement in a horizontal plane, heating means carried by said carriage and adapted to heat said rock to a fusing temperature along predetermined lines when said carriage is moved, means movable in unison with said heating means for immediately chilling said heated rock to cause the disintegration thereof into its constituent parts thus to form a channel in said rock, and automatic means for progressively moving said heating means toward the rock to progressively increase the depth of said channel along said predetermined lines.

2. Apparatus of the character described comprising a support adapted to be superimposed upon a mass of rock to be removed, a carriage mounted on said support for movement in a horizontal plane, heating means carried by said carriage and adapted to heat said rock to a fusing temperature along predetermined lines when said carriage is moved, means movable in unison with said heating means for immediately chilling said heated rock to cause the disintegration thereof into its constituent parts, thus to form a channel in said rock, and means for automatically moving said heating means and said chilling means inwardly towards said rock to progressively increase the depth of said channel.

3. Apparatus of the character described comprising a support adapted to be superimposed upon a mass of rock to be removed, a carriage mounted on said support for movement in a horizontal plane, heating means carried by said carriage and adapted to heat said rock to a fusing temperature along predetermined lines when said carriage is moved, means movable in unison with said heating means for applying water to said heated rock to chill the same and to cause the disintegration thereof into its constituent parts, thus to form a channel in said rock, and automatic means for progressively moving said heating means toward the rock to progressively increase the depth of said channel along said predetermined lines.

4. Apparatus of the character described comprising a support adapted to be superimposed upon a mass of rock to be removed, a carriage mounted on said support for movement in a horizontal plane, heating means carried by said carriage and adapted to heat said rock to a fusing temperature along predetermined lines when said carriage is moved, means movable in unison with said heating means for applying water to said heated rock to chill the same and to cause the disintegration thereof into its constituent parts thus to form a channel in said rock, and means movable with and supported by said carriage for projecting a stream of air into said channel to expel the sludge formed by the water and disintegrated rock.

5. Apparatus of the character described comprising a support adapted to be superimposed upon a mass of rock to be removed, a carriage mounted on said support for movement in a horizontal plane, heating means carried by said carriage and adapted to heat said rock to a fusing temperature along predetermined lines when said carriage is moved, means movable in unison with said heating means for applying water to said heated rock to chill the same and to cause the disintegration thereof into its constituent parts thus to form a channel in said rock, means movable with and supported by said carriage for projecting a stream of air into said rock, and means for controlling the volume of air delivered to said channel.

6. Apparatus of the character described comprising a support adapted to be superimposed upon a mass of rock to be removed, a carriage mounted on said support for movement in a horizontal plane, heating means carried by said carriage and adapted to heat said rock to a fusing temperature along predetermined lines when said carriage is moved, means movable in unison with said heating means for immediately chilling said heated rock to cause the disintegration thereof into its constituent parts, thus to form a channel in said rock, means associated with said heating means for projecting a mixture of air and water under pressure against said heated rock to chill the same and cause the disintegration thereof, and automatic means for progressively moving said heating means toward the rock to progressively increase the depth of said channel along said predetermined lines.

7. Apparatus of the character described comprising a support adapted to be superimposed upon a mass of rock to be removed, a carriage mounted on said support for movement in a horizontal plane, heating means carried by said carriage and adapted to heat said rock to a fusing temperature along a predetermined line when said carriage is moved, means associated with said heating means for immediately chilling said heated rock to cause the disintegration thereof into its constituent parts thus to form a channel in said rock, means for automatically reversing the direction of movement of said carriage at the end of its travel in opposite directions along said line, and automatic means for progressively moving said heating means toward the rock to progressively increase the depth of said channel along said predetermined lines.

8. Apparatus of the character described comprising a support adapted to be superimposed upon a mass of rock to be removed, a carriage mounted on said support for reciprocating movement in a horizontal plane, heating means carried by said carriage and adapted to heat said rock to a fusing temperature along predetermined lines when said carriage is reciprocated, means associated with said heating means for immediately chilling said heated rock to cause the disintegration thereof into its constituent parts thus to form a channel in said rock, and means for automatically lowering said heating means prior to each successive movement of said carriage whereby the depth of said channel is progressively increased.

9. Apparatus of the character described comprising a support adapted to be superimposed upon a mass of rock to be removed, a carriage mounted on said support for reciprocating movement in a horizontal plane, heating means carried by said carriage and adapted to heat said rock to a fusing temperature along predetermined lines when said carriage is reciprocated, means associated with said heating means for immediately chilling said heated rock to cause the disintegration thereof into its constituent parts thus to form a channel in said rock, and means controlled by the movement of said carriage for lowering said heating means prior to each successive movement of said carriage, whereby the depth of said channel is progressively increased.

10. Apparatus of the character described comprising a support adapted to be superimposed above a block of rock to be surfaced, a carriage mounted on said support for reciprocating movement in a horizontal plane, heating means carried by said carriage and adapted to heat the surface of said rock to a fusing temperature along predetermined lines when said carriage is reciprocated, means associated with and disposed in the rear of said heating means for immediately chilling said heated rock to cause the disintegration thereof into its constituent parts and means including a longitudinally reciprocable shaft for progressively advancing said carriage in a direction transverse to its path of reciprocation, whereby the surface of said rock is progressively removed to a predetermined depth.

11. A method of quarrying which comprises heating the rock to a fusing temperature along predetermined lines, immediately chilling said heated rock to cause the disintegration thereof into its constituent parts within a channel defined by said lines, intermittently moving the heating means to progressively increase the depth of the channel formed thereby, and projecting a controlled stream of fluid into said channel to expel the accumulations of disintegrated rock therefrom.

12. A method of quarrying which comprises heating the rock to a fusing temperature along predetermined transverse lines disposed in a plane extending substantially parallel to the planes of cleavage of said rock, immediately chilling said heated rock to cause the disintegration thereof into its constituent parts, intermittently moving the heating means to progressively increase the depth of the channel formed thereby along said predetermined lines, projecting a controlled stream of fluid into said channel to expel the accumulations of disintegrated rock therefrom, and removing the rock defined by said recesses from the parent mass of rock, by separating the same along a line of cleavage.

13. A method of quarrying which comprises forming a plurality of holes defining one side of the block of rock to be removed, forming channels from the exposed vertical face of said rock to said holes, forming another channel connecting said holes and extending transversely to said first mentioned channels, separating said block from the parent mass of rock by splitting the block along a line of cleavage, said channels being formed by heating the rock to a fusing temperature and immediately chilling said heated rock to cause the disintegration thereof into its constituent parts, intermittently moving the heating means to progressively increase the depth of the channel formed thereby, and projecting a controlled stream of fluid into said channel to expel the accumulations of disintegrated rock therefrom.

WALTER C. REA.